United States Patent [19]

Roosa et al.

[11] 4,341,238
[45] Jul. 27, 1982

[54] FLUSHING MEANS

[76] Inventors: Vernon D. Roosa, 184 Wood Pond Rd., West Hartford, Conn. 06107; Peter V. Roosa, 253 Fairview Ave., Hamden, Conn. 06514

[21] Appl. No.: 269,537

[22] Filed: Jun. 3, 1981

Related U.S. Application Data

[63] Continuation-in-part of Ser. No. 801,088, May 27, 1977.

[51] Int. Cl.³ ...................... F16K 31/18; F16K 33/00
[52] U.S. Cl. ....................................... 137/414; 4/324; 4/366; 4/390; 4/391; 137/410; 137/432; 137/449; 251/46
[58] Field of Search ................... 4/324, 366, 375, 390, 4/391; 137/410, 414, 429, 430, 432, 437, 445, 449; 251/35, 45, 46

[56] References Cited

U.S. PATENT DOCUMENTS

| | | | |
|---|---|---|---|
| 1,623,374 | 4/1927 | Anderson | 137/449 |
| 3,115,153 | 12/1963 | Delamater | 137/432 |
| 3,144,874 | 8/1964 | Goldtrap | 137/414 |
| 3,285,277 | 11/1966 | Goldtrap | 137/414 |
| 3,554,219 | 1/1971 | Hudson | 137/414 |
| 3,693,649 | 9/1972 | Gordon et al. | 137/414 |
| 3,729,017 | 4/1973 | Brandelli | 137/414 |
| 3,982,556 | 9/1976 | Roosa | 137/432 |

Primary Examiner—George L. Walton
Attorney, Agent, or Firm—Holland, Armstrong, Wilkie & Previto

[57] ABSTRACT

An improved flushing device is disclosed for use in tanks such as are used for flushing toilets. The flushing device has an inlet means including an improved two-stage valve which uses inlet line pressure in operating each of the two stages. A float is movably mounted on an inlet fixture for use in controlling the tank filling operation with a lever operatively coupling the float to the first stage of the valve. A vertical hollow overflow tube including a bowl filling aperture cooperates with a liquid operated variable buoyancy means on the float and alternatively a tube connects the inlet means with an overflow tube.

7 Claims, 12 Drawing Figures

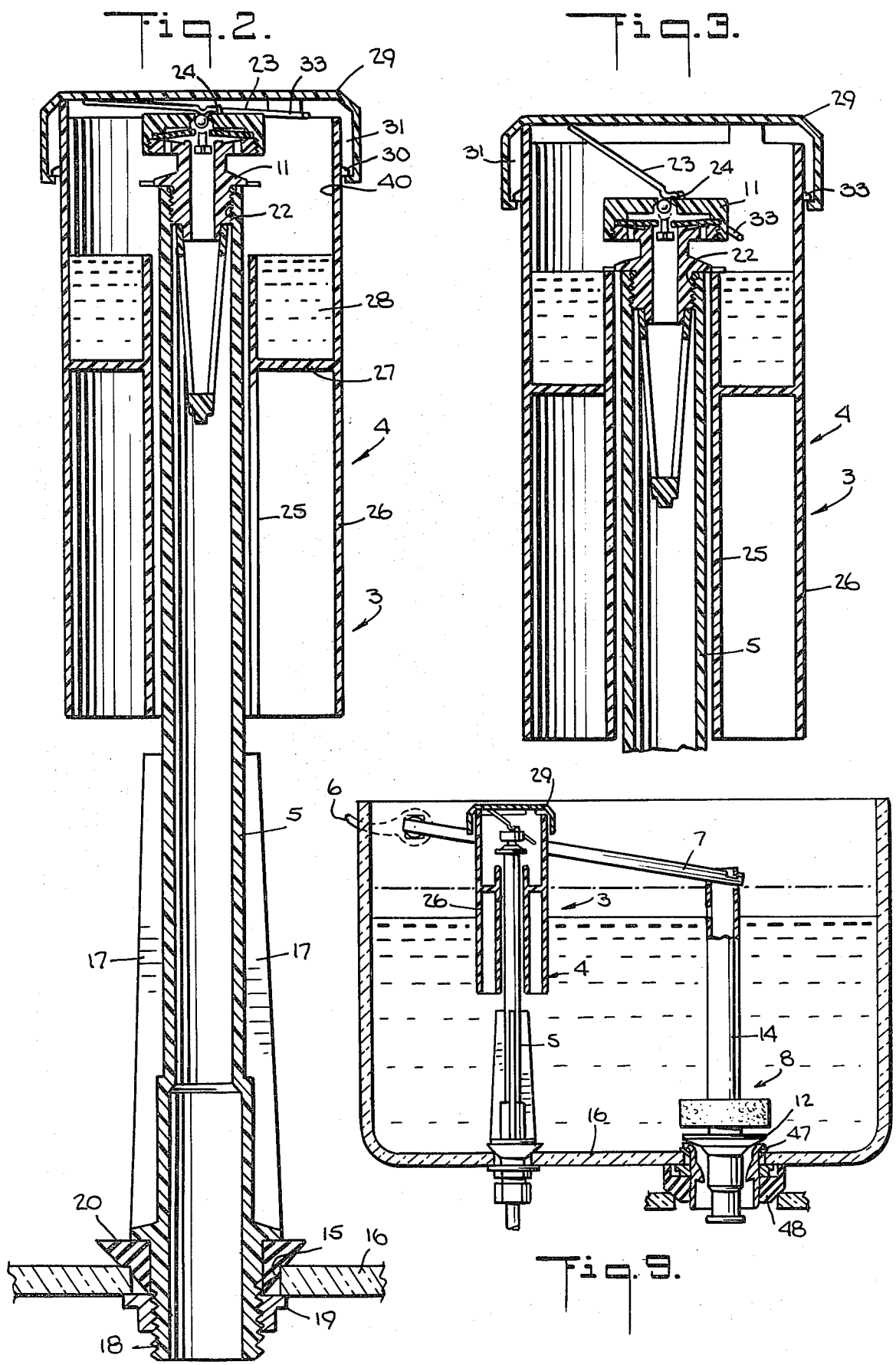

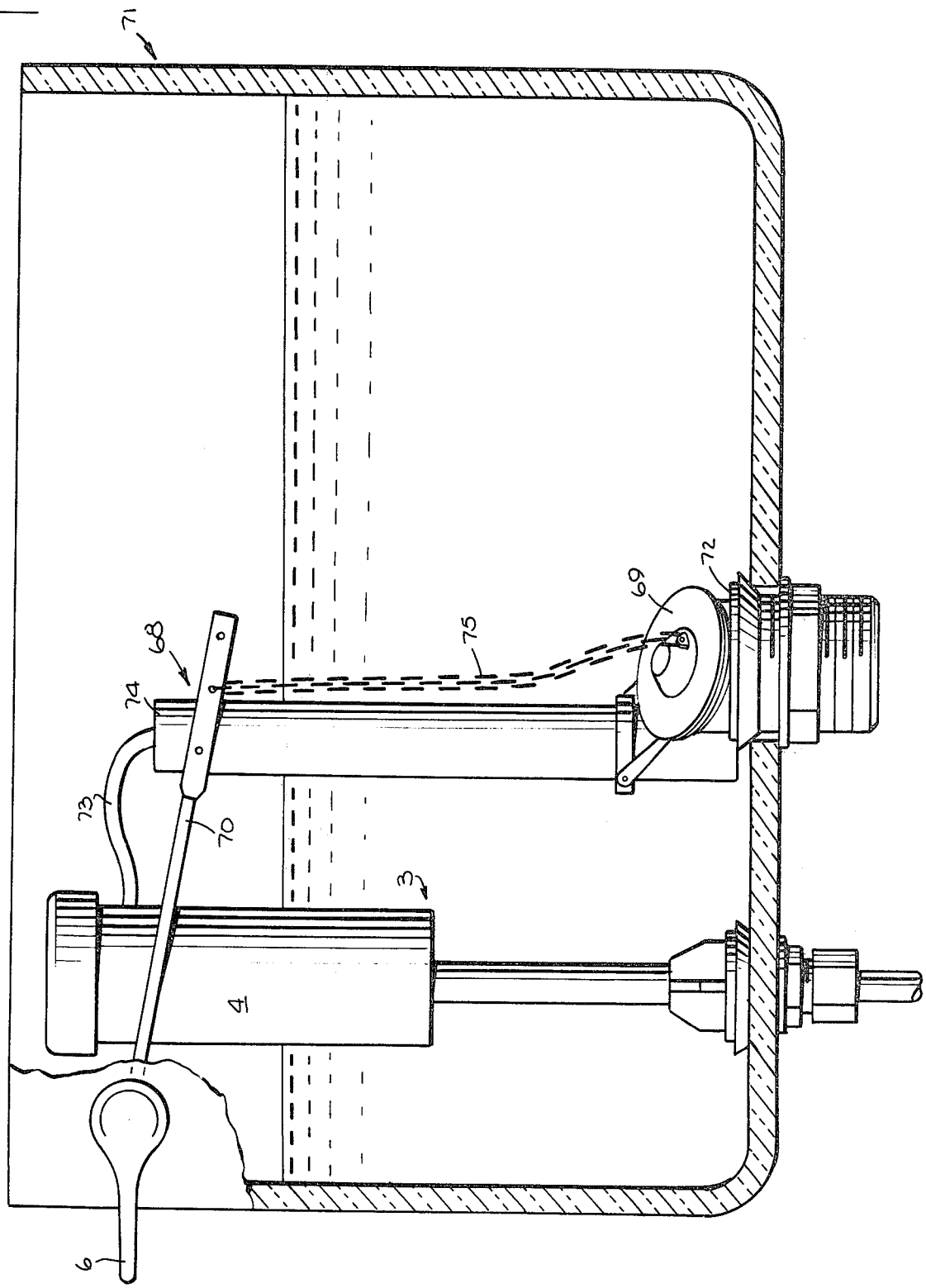

FLUSHING MEANS

This application is a continuation-in-part of our co-pending U.S. patent application Ser. No. 801,088 filed May 27, 1977.

BACKGROUND OF THE INVENTION

The present invention relates to a flushing device and more particularly to a flushing device for use in tanks for flushing toilets.

The flushing device, in accordance with the present invention, is an improvement over various well-known flushing devices. It provides a positively acting and reliable flushing action in a simplified structure employing a minimum number of parts most of which are readily molded from plastic.

There are several prior flushing device designs which utilize combinations of water inlet control elements which cooperate with tank flushing valves. Most of these prior flushing devices are based upon the use of relatively large and complex inlet valve arrangements employing interconnected float controls and flushing valve and bowl leveling means. The flushing device of the present invention incorporates a relatively simple and reliable inlet valve adapted for having its principal portions formed of plastic and further having a two stage valve action using inlet water pressure for the second stage shut-off. A cooperating flushing valve, similarly adapted for being formed of plastic, is positive in action and in combination with the tank inlet valve includes a novel bowl leveling means.

Accordingly, an object of the present invention is to provide an improved and simplified tank flushing device.

Another object of the present invention is to provide a tank flushing device combining simplicity with assured positive action and which is adapted for being manufactured almost completely from molded plastic.

Another object of the present invention is to provide an improved flushing device having a novel two stage fluid control valve which is operated at least in part by the pressure of the controlled fluid.

Another object of the present invention is to provide a float controlled filling device wherein the float has a differing degree of buoyancy for differing portions of the filling cycle.

Another object of the present invention is to provide an improved adjustable flush valve for a flushing device.

Another object of the present invention is to provide an improved bowl leveling means in a tank filling means.

Other and further objects of the invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 2 is an enlarged detailed cross sectional view of the fluid inlet valve in its open position.

FIG. 3 is an enlarged detailed cross sectional view of the inlet valve in its closed position.

FIG. 9 is a vertical sectional view of a toilet tank with the inlet valve and flush valve of the present invention.

FIG. 12 is a sectional view of a toilet tank illustrating another embodiment of the flush valve.

DESCRIPTION OF THE PREFERRED EMBODIMENT

Figure 1:
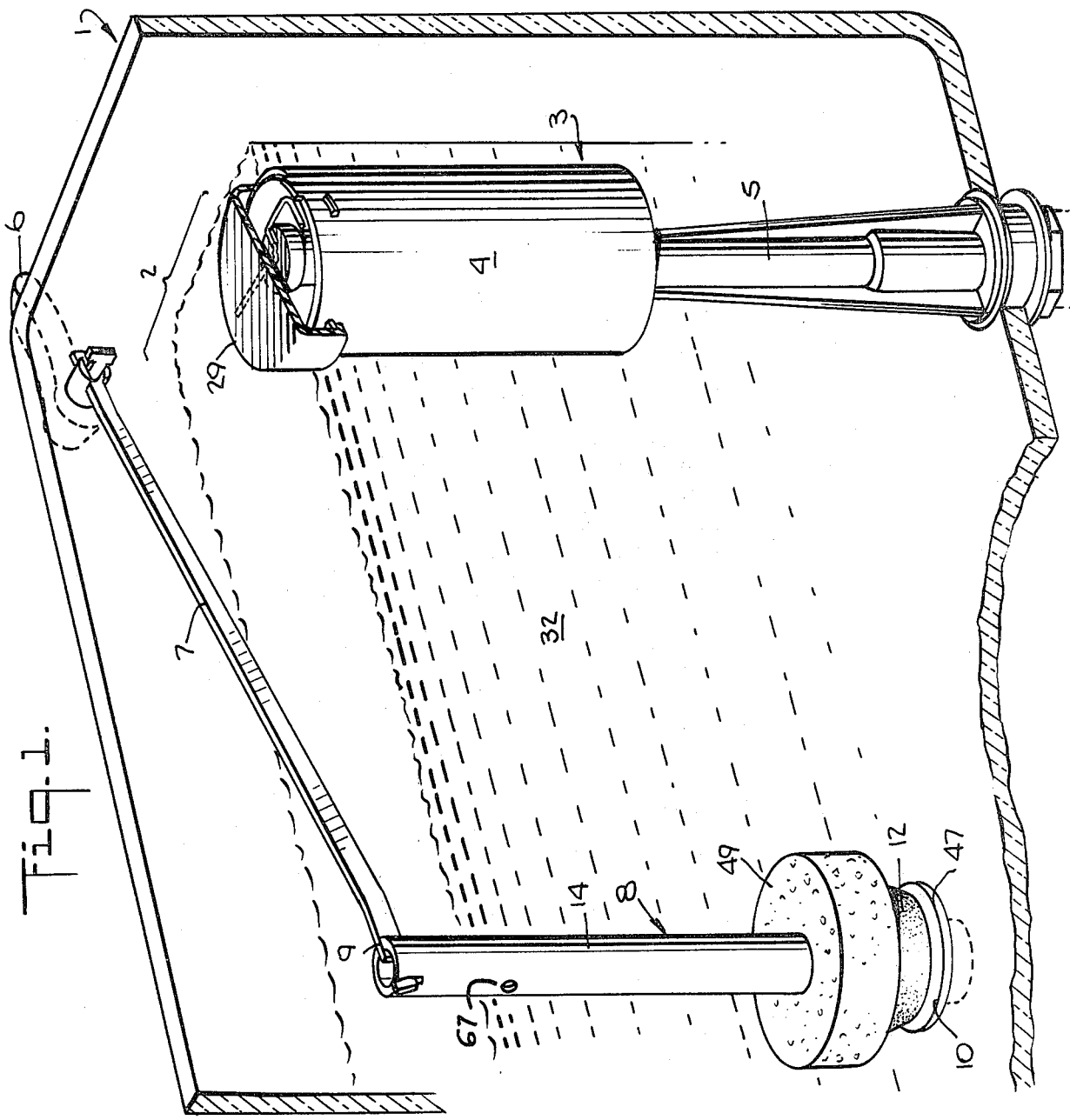
FIG. 1 is a perspective view illustrating a preferred embodiment of the flushing device of the present invention positioned in a toilet flush tank.
Figure 6:
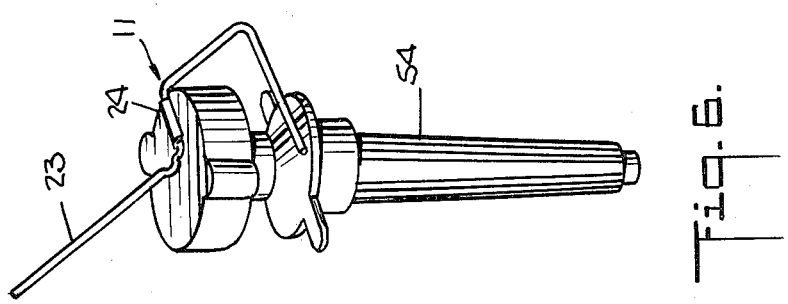
FIG. 6 is an enlarged perspective view of the inlet valve and filter.

FIG. 1 illustrates a toilet flush tank 1 incorporating a flushing means 2 in accordance with the present invention. The tank 1 is in its filled condition preparatory to a flushing cycle. A water inlet assembly 3 is illustrated at the right side of the tank 1. The inlet assembly 3 includes a float 4 for inlet valve operation slidably mounted on the upper end of the inlet fitting 5. As will be more fully described below, the float 4 controls the water inlet assembly 3 during a flushing cycle in accordance with the level of the water in the tank 1.

Described generally, the flushing operation is controlled by a flush handle 6 which is turned to raise the left end (FIG. 1) of a flushing lever 7 together with a flush valve 8 which is coupled at 9 to the lever 7. Raising the flush valve 8 opens the flush outlet 10 to a connected toilet bowl to cause the usual siphon or overflow flushing therein. The lowering water level in the tank 1 causes the slidably mounted float 4 to drop on the inlet fitting 5 opening an inlet valve 11 to start the filling action. The flush valve 8 drops with the falling water level until its sealing gasket 12 reseals the tank outlet 10. Water continues to flow inwardly through the opened inlet valve 11 filling the tank 1 and raising the float 4 upwardly to its inlet valve 11 closing position.

The preferred embodiments of the water inlet assembly 3 and the flush valve 8 will now be described in greater detail.

THE TANK WATER INLET ASSEMBLY

FIGS. 2 through 6 illustrate details of the preferred inlet assembly 3. The inlet assembly 3 includes the inlet fitting 5 (FIGS. 2 and 3) mounted vertically in the tank 1 in an inlet aperture 15 in the tank 1 bottom 16. The inlet fitting 5 includes radial flanges 17 positioned above a threaded portion 18. A nut 19 completes a watertight mounting of the inlet fitting 5 on the tank bottom 16 by tightly fastening the inlet fitting 5 in the aperture 15 on a resilient annular sealing washer 20.

Figure 4:
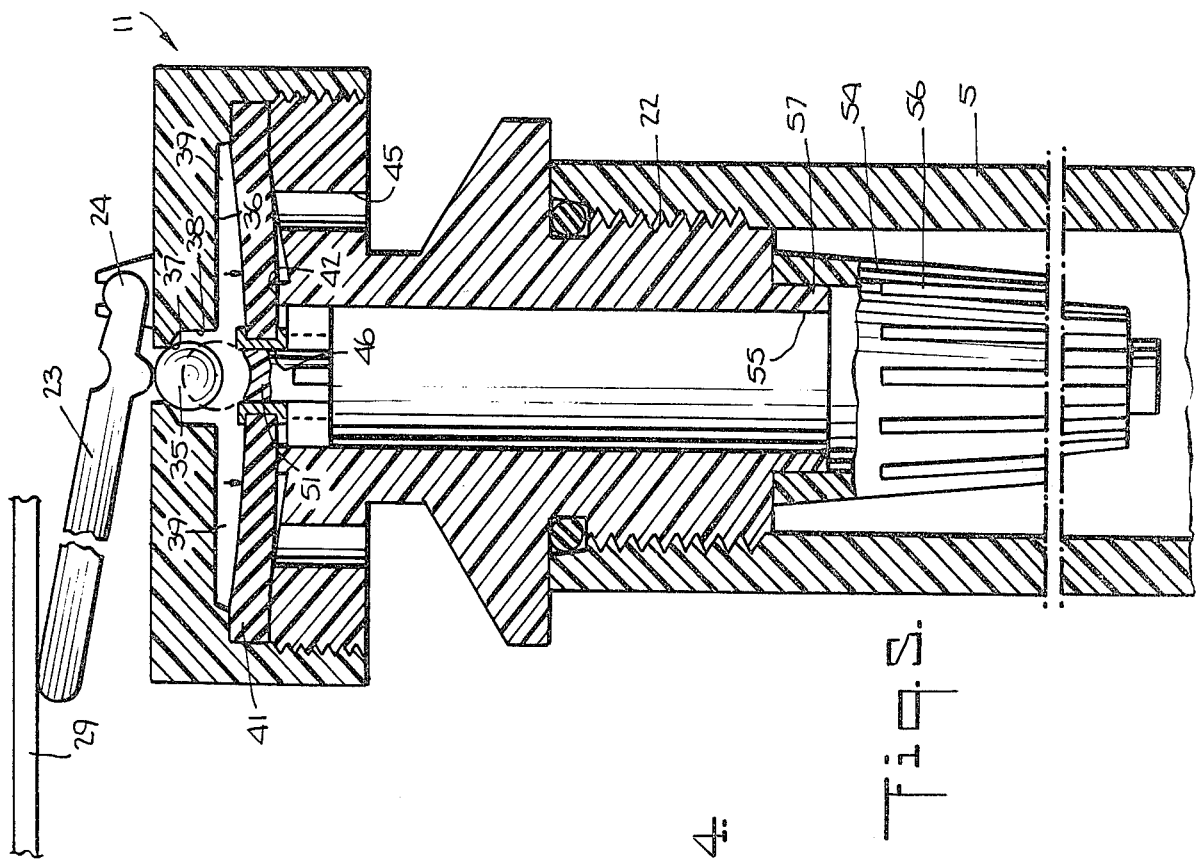
FIGS. 4 and 5 are enlarged detailed cross sectional views of the two stage inlet valve in opened and closed positions respectively.
Figure 5:
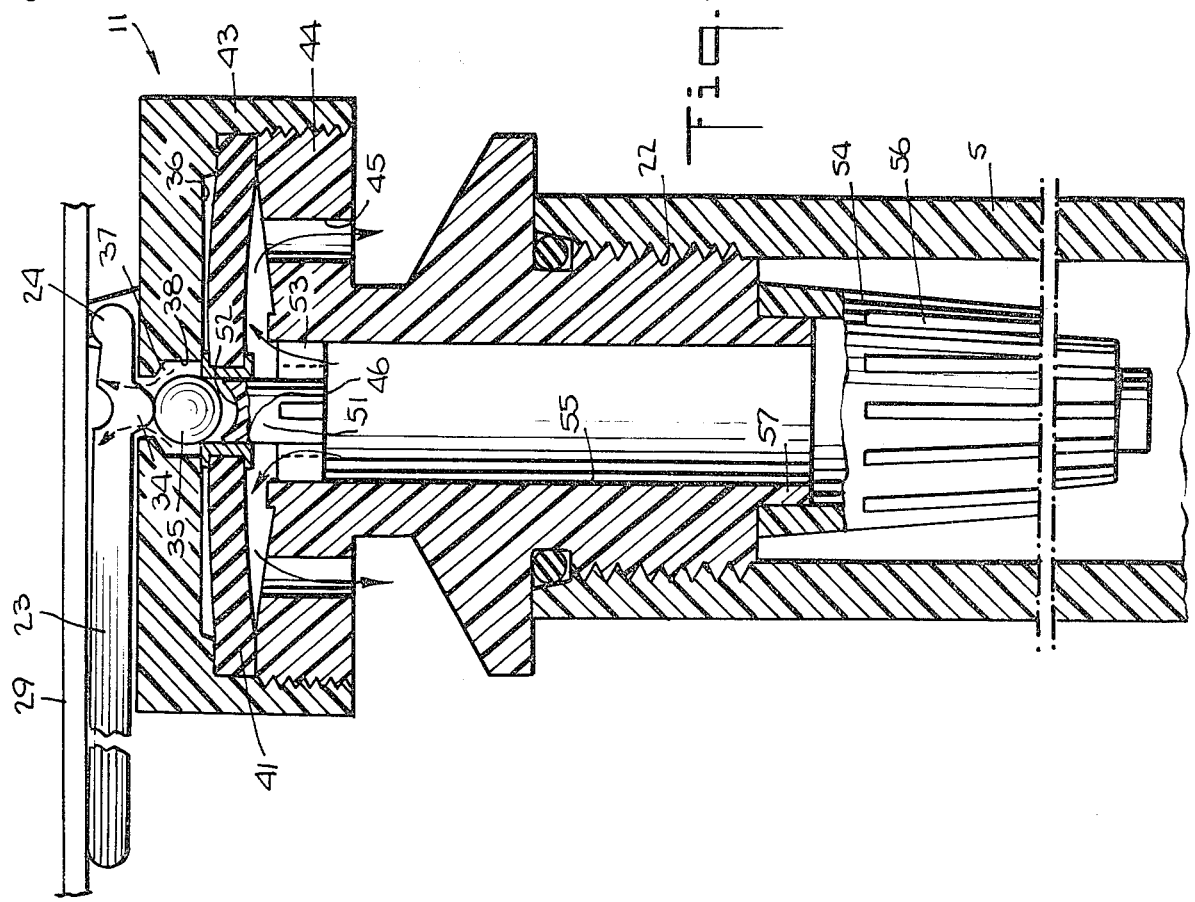

Reinforcing flanges 17 may be formed on the lower portion of the inlet fitting 5. The inlet valve 11 is tightly fastened to the top of the inlet fitting 5 by a suitable threaded or welded connection at 22. A valve operating lever 23 is pivotally mounted at 24 on the valve 11 for control by the float 4. The float 4 includes a cylindrical inner sleeve 25 which slidably mounts it on the inlet fitting 5 for movement by the tank water between a raised or valve closed position, as illustrated in FIGS. 3 and 5, and a lowered or valve open position as illustrated in FIGS. 2 and 4. The float 4 has a cylindrical outer shell 26 connected by an airtight flange 27 to the inner sleeve 25 which combine to form an air chamber beneath a central ballast chamber 28. Trapped air in this open bottomed chamber causes the float 4 to rise to its valve shut-off position as water rises in the flush tank 1. The weight of water in the ballast chamber 28 controls the floating level of the float 4 to provide the valve shut-off at a desired level of tank water in a manner to be described below. A float cover 29 is attached to the float outer sleeve 26 by a bead 30 which engages a flange 31 on the float 4. The under surface of the float cover 29 provides a camming surface for engaging the above referred to valve operating lever 23. Water flowing from the valve 11 when it is opened accumulates in the chamber 28 and 40 and passes through the openings around the float cover 29 as well as downwardly between the inner float sleeve 25 and the inlet fitting 5 and through the bowl level flow tube 73 (FIG. 12).

The operation of the inlet valve 11 will now be described with particular reference to detailed FIGS. 4 and 5. FIG. 5 illustrates the inlet valve 11 in its closed position corresponding to the filled tank situation as also illustrated in FIGS. 1, 3 and 9. The float 4 has been raised by the water 32 in the tank 1 causing the interrelated inlet valve 11 to close. The cover 29 of the float is illustrated in its floating or raised position spaced upwardly from the top of the inlet valve 11 (FIG. 5) with the valve operating lever 23 also in its raised or closed position. The lever 23 swings freely on the pivot 24 as, in its preferred form, it includes a counterbalancing portion 33 opposite to the float engaging portion. When the float top 29 has been lifted by the tank water 32, its downward force is removed from the lever 23 and the lever 23 tends to swing its ball engaging projection 34 upwardly by the action of the counterbalancing portion 33. This permits the valve ball 35 to be forced upwardly within the inlet valve cavity 36 against its seal 37 in outlet 38, as illustrated in FIGS. 3 and 5. The pressure of the inlet water 39 passing through an aperture 46 in a flexible valve diaphragm 41 tends to move and to hold the ball 35 in this raised and shut position. Water 39 in the cavity 36 above the diaphragm 41 is trapped causing its pressure to increase to the inlet pressure and the diaphragm 41 to flex downwardly against the lower sealing surface 42 of the inlet valve cavity 36. The flexible diaphragm 41 is gripped between the upper valve body portion 43 and the lower valve body portion 44 which is attached at 22 to the inlet fitting 5. When the diaphragm 41 is in its downward or shut-off position, its seats against the lower sealing surface 42 closing off the several valve outlet ports 45 provided in the lower valve body portion 44. The aperture 46 is preferably formed in a spool shaped plastic insert 47 in the diaphragm to keep the aperture 46 size uniform and unchanging.

The float 4 characteristics are set in combination with those of the inlet valve 11 operating lever 23 to permit the ball 35 to seat at a desired tank water level.

FIGS. 2 and 4 illustrate the inlet valve 11 in its open or tank filling position. The valve 11 is opened to the position illustrated in FIGS. 2 and 4 by the action of the float 4 on the operating lever 23 during a flushing operation. The lowering of the water in the flush tank 1, after the flush valve 8 is opened, causes the float 4 and its top 29 to drop downwardly to the top of inlet valve 11 in the position illustrated in FIGS. 2 and 4 causing a corresponding downward movement of the projection 34 on the inlet valve operating lever 23. The projection 34 pushes the ball 35 downwardly and clear of the seat 37. Water in the valve cavity 36 above the diaphragm 41 now flows upwardly through the outlet 38 releasing the downward fluid pressure on the diaphragm 41 and exposing the lower surface of the diaphragm 41 to the pressure of the incoming water. The water pressure in the inlet fitting 5 holds the diaphragm 41 in its raised position with its diaphragm aperture 46 being closed by contact with the lower surface of ball 35. The closing of the aperture 46 prevents the passing of particles therethrough and onto seat 37 thereby preventing clogging. The principal water flow through the inlet fitting 5 passes outwardly through the several valve outlet ports 45 and thence through the float 4 into the tank 1.

The aperture 46 in the diaphragm insert 47 is preferably circular and a post 51 is mounted in the central passage in the valve body portion 44 having a cross section similarly shaped and only slightly smaller than the aperture 46 so that it slides into the insert 47 aperture 46. The post 51 has a concave upper surface 52 to receive the ball 35 in its open position as seen in FIG. 4. The post 51 is mounted on radial and spaced mounting arms 53.

The post 51 provides the function of throttling the water flow through the aperture 46 in the diaphragm thereby preventing the passage of objectionably large particles above the diaphragm to foul the ball seat. Additionally, as the valve 11 closes to the position of FIG. 5 and the diaphragm 41 flexes downwardly, the post 51 tends to dislodge any particles which may have already lodged in the diaphragm orifice 46.

Clogging is also prevented by the use of a filter 54 on the inlet 55 of the valve 11. A preferred embodiment is a hollow unitary molded one with elongated openings 56. Thus filter 54 snaps over a flange 57 on the valve 11. The inlet valve 11 remains in this open position until the float 4 is raised by the filling of the tank 1 to the level where the ball 35 is again forced against its seat 37 as permitted by the rising valve operating lever 23.

THE FLUSHING VALVE

The operation of the tank flushing valve 8 and its cooperation with the above described inlet valve 11 and float 4 action will now be described with particular reference to FIGS. 7 through 12.

FIG. 9 illustrates the tank 1 in its filled preflush or steady state condition ready for a flushing cycle. The float 4 is raised by the water level with its top 29 spaced upwardly from the inlet valve 11 causing the ball 35 to be in its shut-off position as shown in FIGS. 3 and 5.

The flushing valve 8 comprises the vertically oriented hollow tube 14 which has its upper end pivotally connected at 9 to the flushing lever 7. The tank flushing handle 6 is pivotally mounted on the tank 1 wall so that counterclockwise rotation (FIG. 9) of the handle 6 lifts the lever 7 and its interconnected flush valve tube 14. A resilient conical gasket 12 is mounted on the lower end of the tube 14 for engagement with the generally cylindrical plastic valve seat 47 in the tank outlet 10. The valve seat 47 is held in position by a nut 48.

Figure 10:
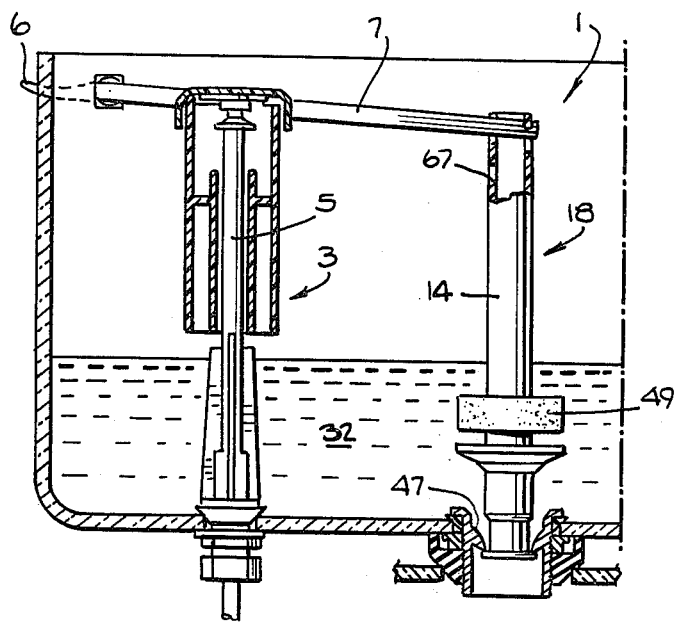
FIG. 10 is a vertical sectional view of the inlet valve and flush valve of the present invention in their open or flushing positions.

A float 49, adjustably positioned on the flushing valve tube 14, controls the termination of the tank 1 draining operation. Once the gasket 12 on the flush valve tube 14 has been lifted clear of the tank outlet 10, as illustrated in FIG. 10, the removal of the unbalanced water pressure on the valve gasket 12 permits the entire flush valve 8 to float in the tank water as the water drains through the outlet 10. This floating action holds the gasket 12 above the outlet 10 until the level of the tank water drops to the point illustrated in FIG. 11, where the gasket 12 again reseals the tank outlet 10 or valve seat 47. This occurs while water is flowing into the tank 1 through the opened inlet valve 11. The water now rises in the tank 1 as the water pressure holds the gasket 12 closed and the tube 14 down due to the large area of the gasket 12 exposed to the water pressure within the tank 1. The water continues to rise in the tank 1 until it moves the float 4 to its valve closing position already described and as illustrated in FIGS. 3 and 5.

Figure 11:
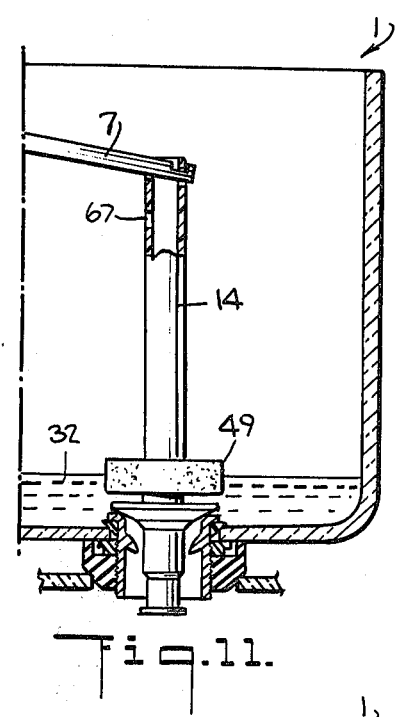
FIG. 11 is a sectional view of a toilet tank illustrating the flush valve of the present invention in its reclosed position.

The amount of water employed in the flush may be controlled by adjusting the position of the float 49 on the flush valve tube 14. The float 49, for example, may be frictionally mounted on the tube 14. For a large volume of flush water, the float is positioned close to the flush water, the float is positioned close to the flush valve as illustrated in FIGS. 9–11. Should a lesser amount of water be desirable in the flushing operation, the float 49 may be adjusted upwardly to a desired position. In a raised position, the float 49 causes an earlier closing of the flush valve 8 leaving a larger amount of water within the tank.

Figure 7:
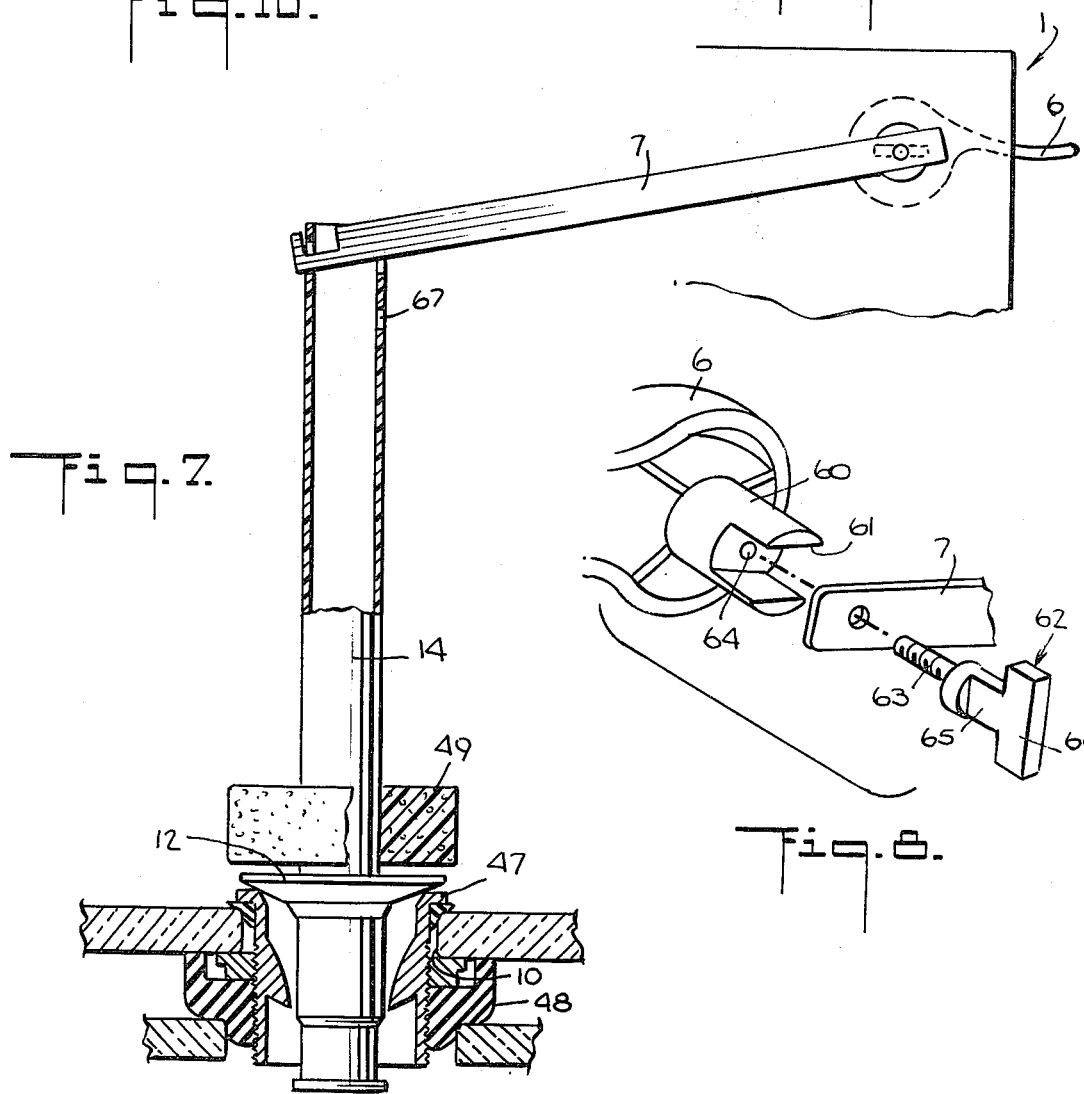
FIG. 7 is a side elevational view, partially in section, of the flush valve and operating handle.
Figure 8:
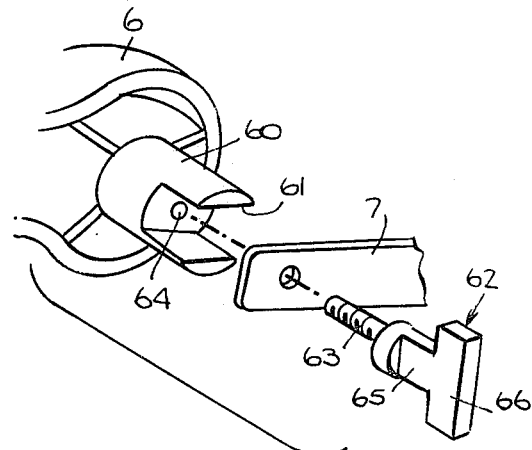
FIG. 8 is an enlarged exploded perspective view of the handle mounting.

FIGS. 7 and 8 illustrate a preferred embodiment of the handle 6 and the flushing lever 7 for controlling the flush valve 8. The handle 6 has a projecting bearing 60 which is proportioned to fit through a corresponding aperture in the wall of the flush tank 1. The bearing 60 includes a slot 61 for mounting the lever 7. The slot 61 has a cross section shaped to snugly fit the end of the lever 7. A bolt 62 is used to removably fasten the lever 7 to the handle bearing 60 by turning its threaded end 63 into a suitably threaded opening 64 in the bearing 60. The attaching bolt 62 preferably includes an elongated shank 65 which fits within the bearing slot 61 and an outer finger grip 66. When assembled, the bearing 60 permits a rotation of the handle 6 and the attached lever 7 slides against the inner tank wall to hold the handle and lever in position. The handle and lever assembly is thus free to turn and there is no tendency for it to bind or to become disassembled during continuing use.

The flushing valve arrangement illustrated in FIGS. 9 through 11 provides for a bowl filling action in the following manner. The inlet assembly 3 is arranged so that its float 4 shuts off the water flow into the tank 1 when the water rises to a level near the top of the overflow tube 14. At this level the inlet valve 11 closes. A bowl filling aperture 67 is provided in the tube 14 a short distance down from the top of the tube 14. Water now drains from the tank 1 through the tube aperture 67 into the bowl until the tank water level falls below the aperture 67. During this time, the inlet valve 11 remains closed because there is a simultaneous drainage of the float 4 as the water within the float 4 falls below the flange 27. This water drainage from within the float 4 causes the float 4 to rise so that its cover 29 remains well above the inlet valve 11 which stays in its closed position.

FIG. 12 illustrates another embodiment of a flush valve arrangement. In this embodiment, a flush valve 68 comprises a chain 75 operated valve flapper 69 which is raised by the lever 70 for the flushing action. Once the bouyant flapper 69 is opened, it remains open until the tank 71 has drained down to about the level of the tank outlet 72 at which time it recloses. In this embodiment, the bowl filling operation is accomplished by a tube 73 running from the interior of the float 4 as already described to the top of a hollow overflow tube 74.

The bowl leveling water flows through the tube 73 during the tank filling and the additional period after the inlet valve 11 has closed and while the float 4 is draining in the manner already described to its final position.

It will be seen that a simplified and reliable flushing means has been provided for a toilet tank. The means includes a minimum number of parts with most of the principal parts being adapted for being formed from molded plastic. A positively acting and adjustable flushing means is provided which is durable and efficient and which may be manufactured at a relative low cost. The improved system, with a minimum number of working parts also provides a flushing system which is relatively maintenance free and which has a long working life.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. An improved fluid inlet means for a flushing tank comprising the combination of:
    an inlet fitting adapted for being coupled to a source of fluid under pressure and for being mounted within the tank;
    a float movably mounted on said inlet fitting for movement between raised and lowered positions responsive to the level of liquid in the bank;
    an inlet valve with a cavity positioned on said inlet fitting, said inlet valve having an inlet part and two outlet parts serving said cavity;
    a first valve shut-off means including a ball and a ball seat in said inlet valve cavity at one outlet part;
    means operatively coupling said float to said first ball for moving said ball from a closed position on said seat to an opened position against the pressure of fluid in said inlet fitting cavity;
    a second shut-off means at said other outlet part comprising a flexible diaphragm a fluid passing aperture and being movable between open position and a closed position sealing said other outlet part by fluid pressure in said inlet valve cavity in response to the closed position of said ball; and
    a post member positioned in said inlet valve cavity including a support for said ball at its open position and a guide surface for fluid aperture in said flexible diaphragm.

2. The fluid inlet means as claimed in claim 1 in which said means operatively coupling said float to said first shut-off means comprises a lever pivotally mounted on said inlet valve with an outer end of said lever remote from said pivot engaging said float, and means on said lever being positioned closer to said pivot than said float engaging portion for engaging said ball.

3. The fluid inlet means as claimed in claim 1 in which said float is slidably mounted on said inlet fitting and includes an air chamber for providing float buoyancy.

4. The fluid inlet means as claimed in claim 3 in which said float includes a ballast means for controlling the float buoyancy.

5. The fluid inlet means as claimed in claim 4 in which said ballast means includes a liquid chamber communicating with the valve outlets of said inlet valve.

6. The fluid inlet means as claimed in claim 1 which further comprises a filter positioned on the inlet of said inlet valve.

7. The fluid inlet valve as claimed in claim 1 which further comprises a rigid lining on said diaphragm.

* * * * *